July 14, 1970     G. V. ANDERSSON     3,520,429

TRANSPORT VEHICLE FOR HEAVY LOADS

Filed June 25, 1968     10 Sheets-Sheet 1

INVENTOR.

Gustaf Verner Andersson

BY Cushman, Darby & Cushman

ATTORNEYS

July 14, 1970 G. V. ANDERSSON 3,520,429

TRANSPORT VEHICLE FOR HEAVY LOADS

Filed June 25, 1968 10 Sheets-Sheet 6

INVENTOR.

GUSTAF VERNER ANDERSSON
BY
Cushman, Darby & Cushman
ATTORNEYS

July 14, 1970  G. V. ANDERSSON  3,520,429
TRANSPORT VEHICLE FOR HEAVY LOADS
Filed June 25, 1968  10 Sheets-Sheet 7

INVENTOR.
GUSTAF VERNER ANDERSSON
BY
Cushman, Darby & Cushman
ATTORNEYS

United States Patent Office 3,520,429
Patented July 14, 1970

3,520,429
TRANSPORT VEHICLE FOR HEAVY LOADS
Gustaf Verner Andersson, Rosson, Sweden, assignor to AB Hagglund & Soner, Ornskoldsvik, Sweden, a corporation of Sweden
Filed June 25, 1968, Ser. No. 739,740
Claims priority, application Sweden, June 28, 1967, 9,514/67
Int. Cl. B65g 67/00
U.S. Cl. 214—314                    15 Claims

ABSTRACT OF THE DISCLOSURE

A transport vehicle for picking up a heavy load carrying basket or ladle, particularly for iron works, and tilting the basket or ladle for emptying, comprising a U-shaped wheel-carried outer frame towed by a tractor and supporting an inner load picking up U-shaped frame which is liftable vertically and is alternatively tiltable about a pivot axis at its rear end by means of hydraulically operated power means.

The present invention relates to transport vehicles of the kind having a rigid frame with parallel legs supported by road wheels and interconnected at their forward ends by a transverse frame member to form a U-shaped frame connected to a tractor unit and supporting an inner rigid U-shaped frame with parallel legs provided with members for picking up and transporting a load carrying receptacle.

Vehicles of this kind are known for carrying loads of the order of 5,000 kg. and include a link system between the legs of the two frames and hydraulically operated power means for moving the inner U-shaped frame obliquely upwardly from a lower end position to an upper end position parallel with the lower end position. Further movement of the link system will tilt the inner U-shaped frame and the load carrying receptacle thereon. The link system of the known construction will operate quite satisfactorily up to loads of the order referred to.

However, at the iron works for example, there is need for transport vehicles of the kind under consideration which should be able to carry loads of the order of 30,000 kg. or more. Specific problems will be involved when handling loads of such order, particularly when they must be handled easily and safely due to the fact that the load may be extremely hot as the case is with iron slag and molten slag.

It is therefore the general object of the present invention to provide a transport vehicle intended for loads of the order of 30,000 kg. or more and which may readily be backed into position to pick up and transport a load carrying receptacle such as a basket or ladle and to tilt the inner U-shaped frame to empty the load carrying receptacle. The vehicle according to the invention is primarily intended to be used at iron works for transporting for example iron ore, scrap iron, iron slag and molten slag.

The specific load under consideration is often relatively hot and therefore the driver's cab must be located at a sufficient distance from the load when supporting it on the inner U-shaped frame. Furthermore, the space above the two U-shaped frames must be free to permit tilting of the load carrying receptacle on the inner U-shaped frame when tilting the same.

Another object of the invention is to provide a vehicle which may be used to alternatively pick up load carrying baskets or ladles.

These and other objetcs of the invention are attained with a vehicle which, according to the invention, is characterized by vertical guides provided at each of the rear and portions of the legs of the outer U-shaped frame for guiding leg supporting members which pivotally support the legs of the inner U-shaped frame, and hydrualically operable power means for moving the forward and rearward ends of the inner U-shaped frame between a lower end position and an upper end position, and alternatively the forward end of the inner U-shaped frame further above the upper end position to tilt the inner U-shaped frame about the pivot axis of the leg supporting members. The vertical guides will thus result in the simplest possible movement of the leg supporting members which are connected with any suitable type of hydraulic jacks or pistons and cylinder devices of known construction supported by the legs of the outer U-shaped frame. The vehicle may thus be constructed in a simple manner to be able to carry the relatively heavy loads referred to above.

These and other objects and advantages derived from the invention will be disclosed more in detail with reference to the accompanying drawings illustrating two embodiments of the vehicle according to the invention.

In the two embodiments illustrated the vehicle has a single pair of forward driving and steering wheels 10 supporting the tractor unit 11, and a single pair of road wheels 12 supporting the outer U-shaped frame 13 (FIG. 1) and 14 (FIG. 12) respectively. The tractor and outer U-shaped frame are connected by a vertical pivot 15.

In contrast to known vehicles of the kind under consideration, the driver's cab 16 is attached to the transverse frame member 13a of the outer U-shaped frame in an asymmetric position as understood from FIGS. 1, 2, 3 and 12, 13, respectively, and so that the driver when sitting in the cab will be substantially in a plane coinciding with the inner side of the adjacent leg of the inner U-shaped frame. Thus, the driver will easily aim at the load carrying receptacle to be picked up by means of said inside of the leg when backing the vehicle in position for picking up the basket or ladle, as will be easily understood from FIG. 3.

Figure 1:
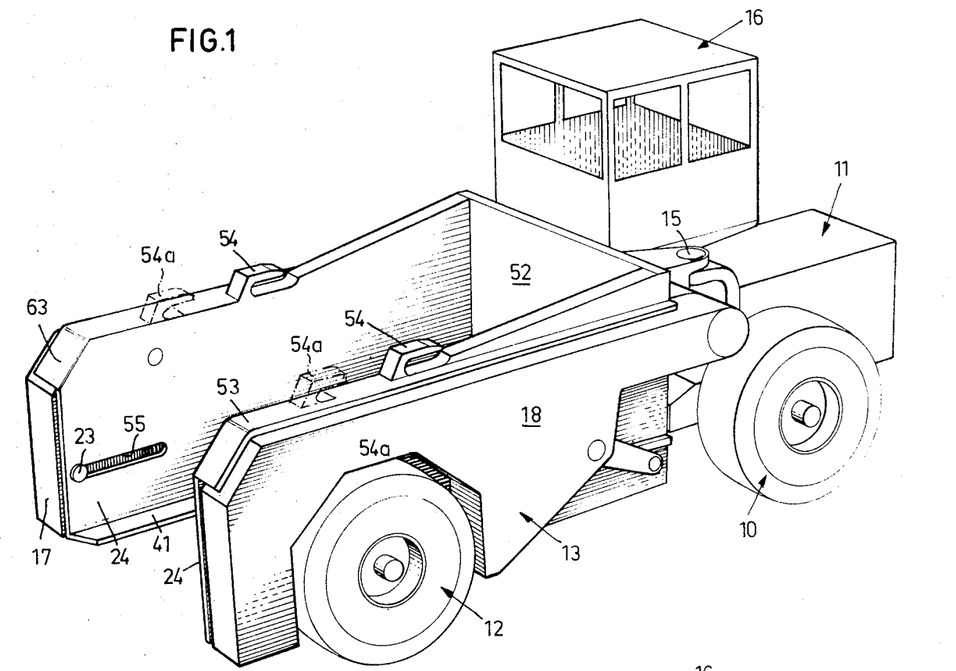
FIG. 1 is a perspective view of an embodiment of the invention which may be used for alternatively transporting a ladle or a basket.
Figure 2:
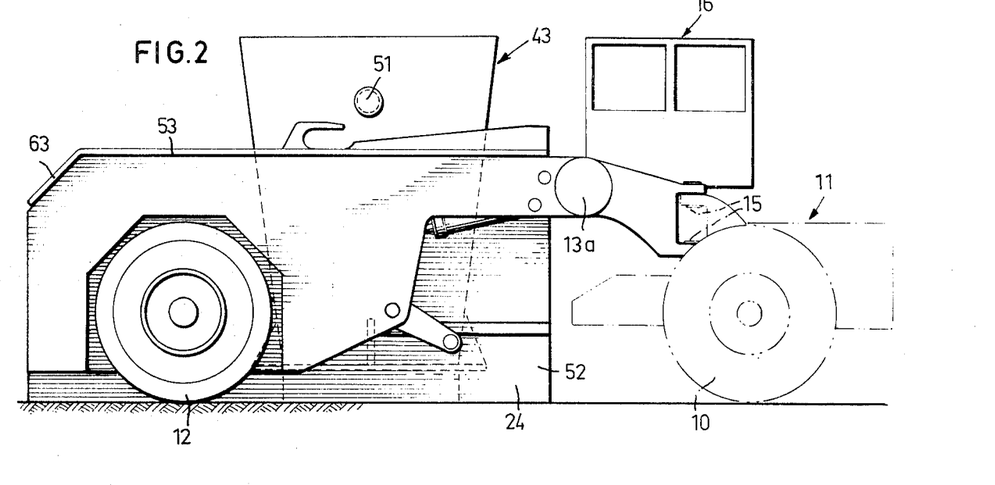
FIG. 2 is an elevational side view illustrating the vehicle in position for picking up a ladle standing on the ground.
Figure 12:
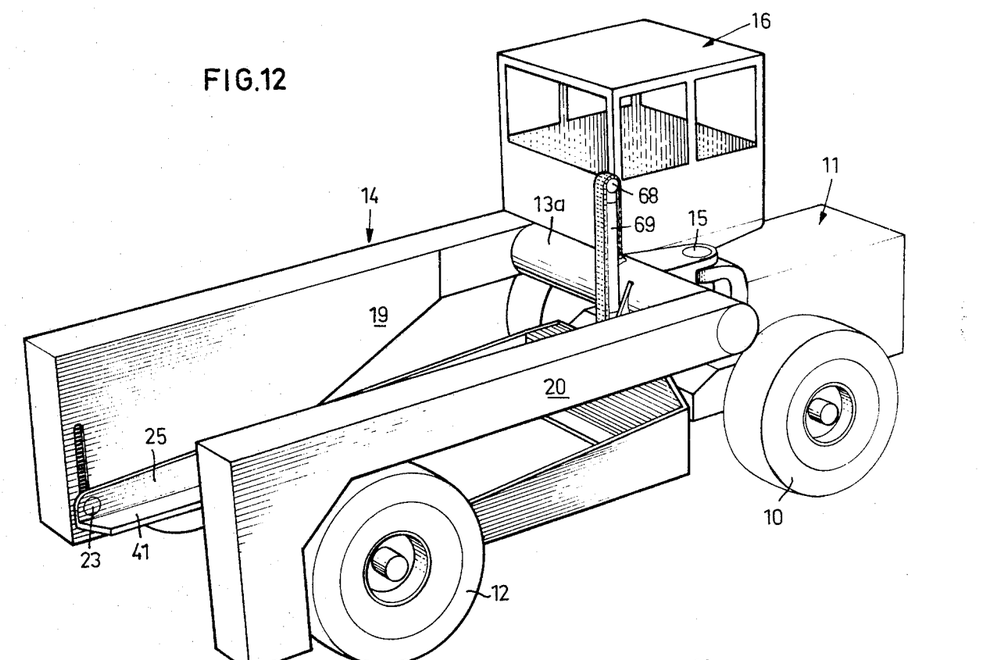
FIG. 12 is a diagrammatic perspective view of another embodiment of the invention which is primarily intended for load carrying baskets of the type shown by way of example in FIG. 20.
Figure 13:
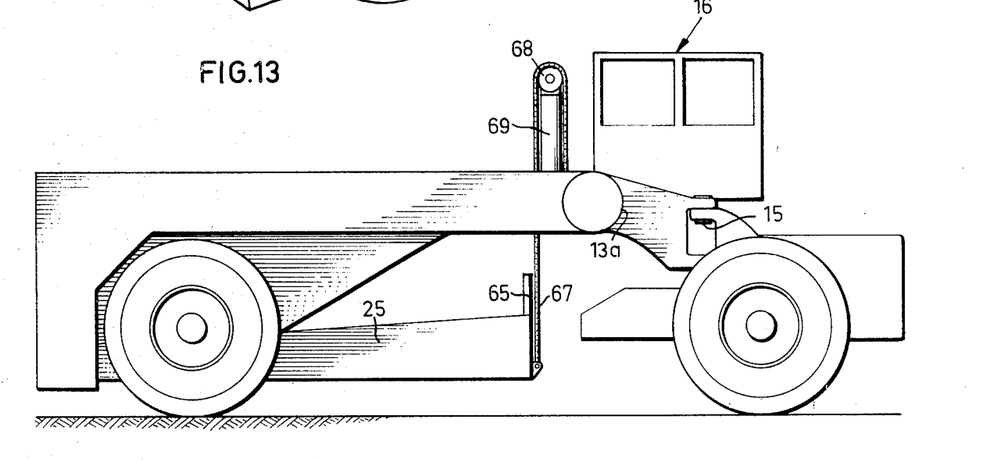
FIG. 13 is an elevational diagrammatic side view of the vehicle in FIG. 12.

In both embodiments shown in FIGS. 1 and 12, the outer U-shaped frame consists of two parallel legs 17, 18 and 19, 20, respectively, of a box-like structure, which in their rear end portions are provided with vertical guides in the form of rails 21 (see particularly FIG. 10) for a carriage 22 with wheels running along the rails.

Each carriage 22 is provided with an inwardly projecting pivot pin 23 which pivotally supports the adjacent leg 24 and 25, respectively (FIGS. 1 and 10) of the inner U-shaped frame.

The hydraulic power means for lifting the carriages 22 and thereby the rear ends of the legs of the inner U-shaped frame may be arranged in different ways.

Figure 6:
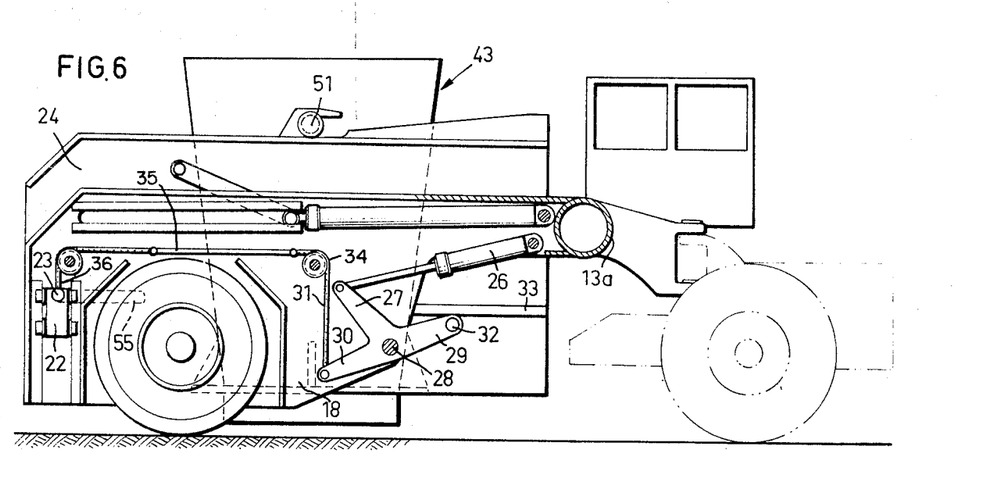
FIG. 6 illustrates how the ladle has been lifted by the inner U-shaped frame to the transport position.
Figure 7:
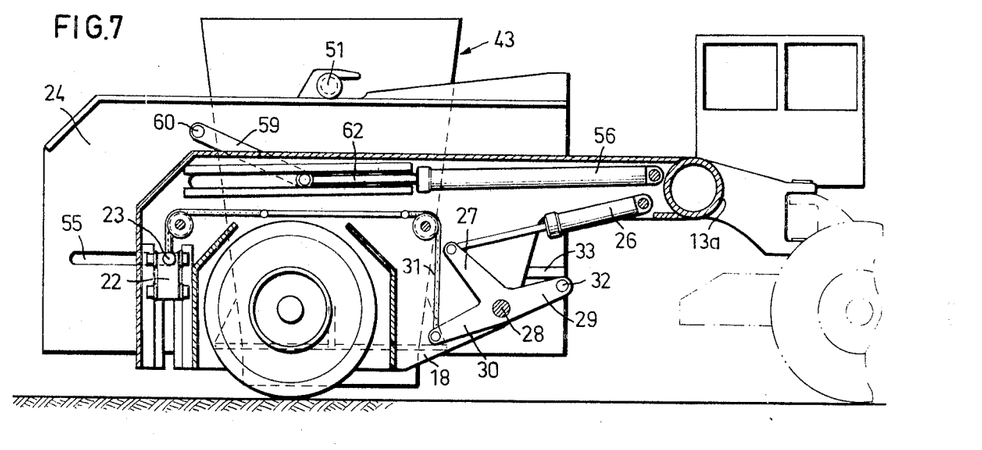
FIG. 7 is the same position as in FIG. 6 except for the inner U-shaped frame which has been displaced rearwarly a distance realtive to the outer U-shaped member.
Figure 8:
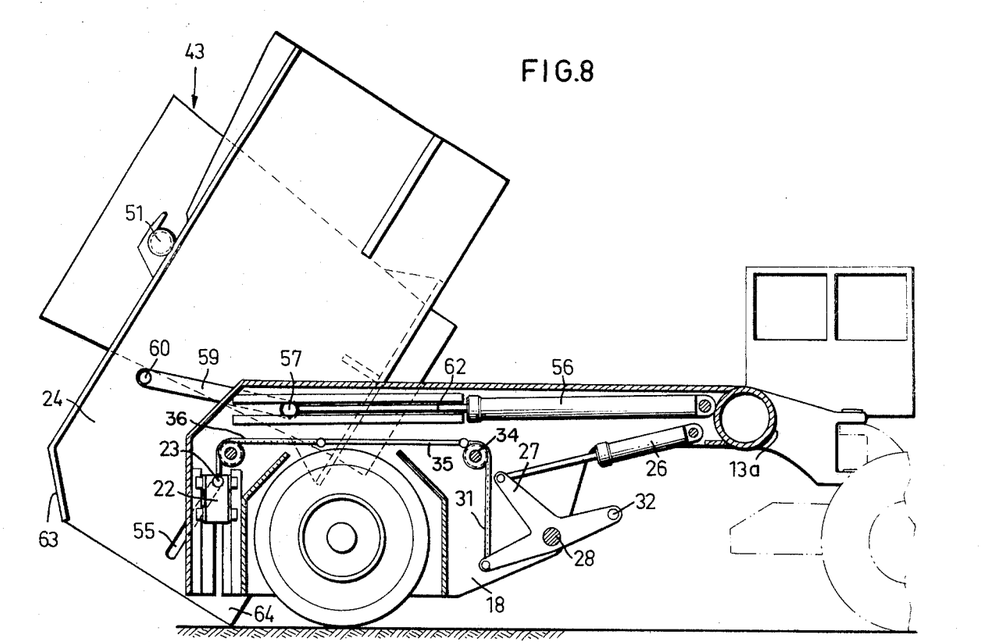
FIG. 8 illustrates the inner U-shaped frame in an intermediate tilted position which is not sufficient to empty the ladle shown but will be sufficient when a load carrying basket is supported by the inner U-shaped frame.
Figure 9:
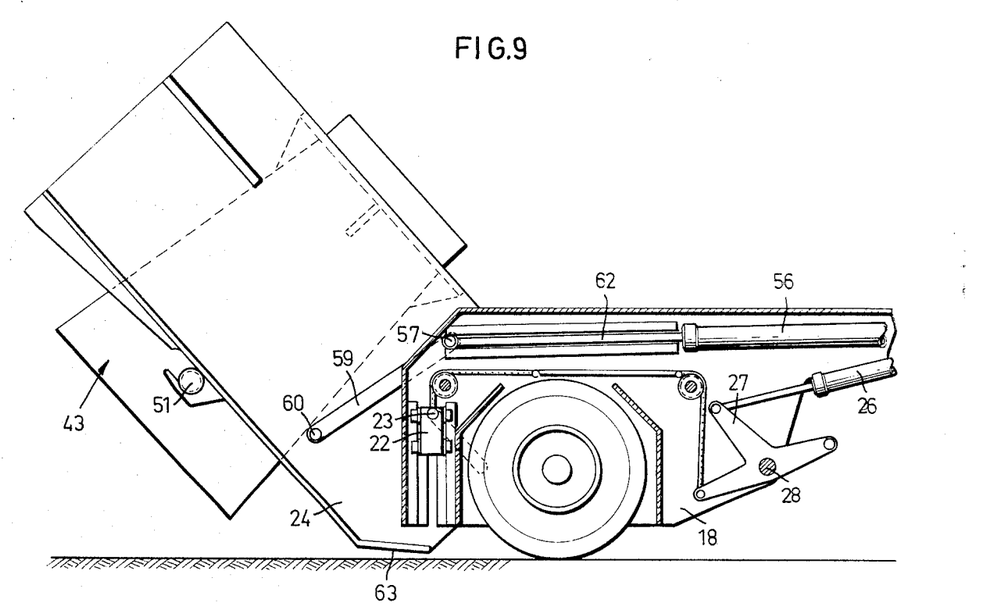
FIG. 9 illustrates the fully tilted position of the inner frame and the ladle.

In the embodiment shown in FIGS. 1 to 10, there is in each leg 17, 18 a hydraulic jack 26 secured with its cylinder to the frame structure of the leg 17 and 18, respectively, and with its piston to one arm 27 of a T-shaped lever rotatably mounted on a pin 28 secured to the leg 17 and 18, respectively. The T-shaped lever futrher has a forward arm 29 and a rearward arm 30. The end of the rearward arm 30 is connected to a chain 31 and the end of the forward arm 29 is provided with a horizontal supporting pin 32 directed towards the adjacent leg 24 to form a support for a longitudinal bracket member 33 on each outer side of the legs 24. Thus, the bracket members 33 will rest freely on the supporting pins 32 in FIGS. 5, 6 and 7 but will permit the inner frame 24 to be tilted about the pivot pins 23 as shown in FIGS. 8 and 9.

Each chain 31 runs over a pulley 34 and is, via a connecting member 35, connected with a chain 36 running over a pulley disposed at the upper end of the vertical guide. The chain 36 is secured to the carriage for lifting it when the T-shaped lever 27, 29, 30 is rotated by the jack 26 in an anti-clockwise direction in the figures. At the same time, the supporting pins will correspondingly lift the forward ends of the legs 24.

Figure 14:
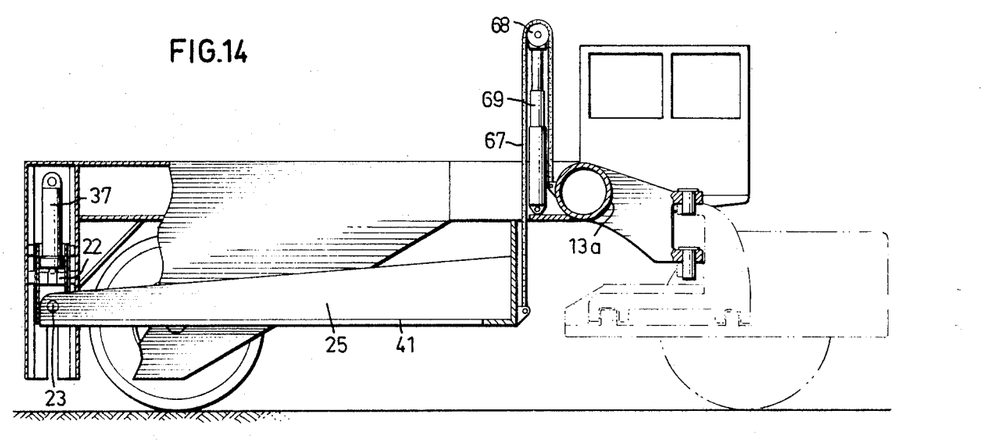
FIG. 14 illustrates the inner U-shaped frame in its upper end position and one of the vertical guides in section with a leg supporting carriage.
Figure 15:
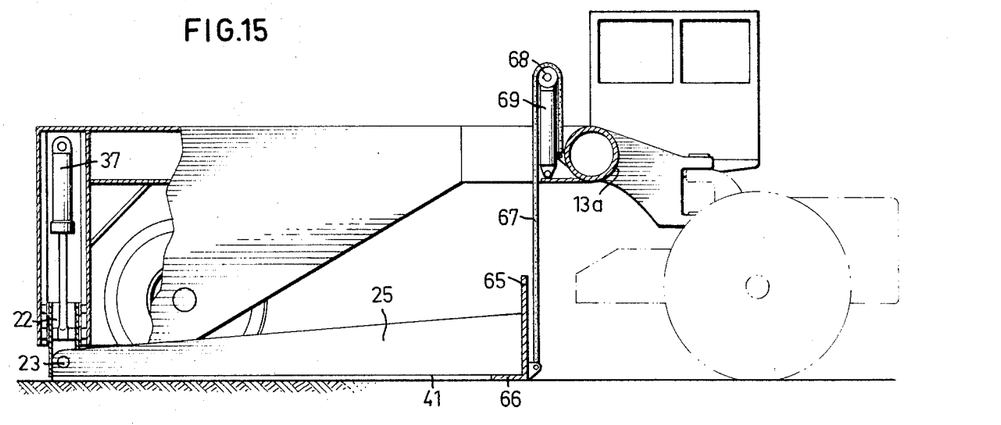
FIG. 15 illustrates the lower end position of the inner U-shaped frame.
Figure 16:
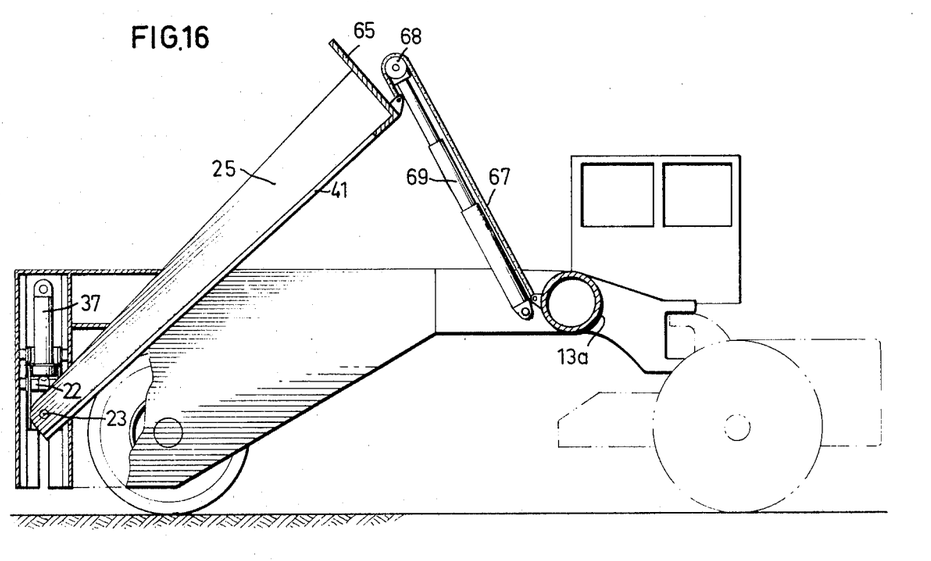
FIG. 16 illustrates the tilted end position of the inner U-shaped frame.

In FIGS. 14, 15 and 16 each leg of the outer frame is provided with a vertical hydraulic cylinder 37 having its upper end secured to the leg and its piston connected to the carriage.

Figure 17:
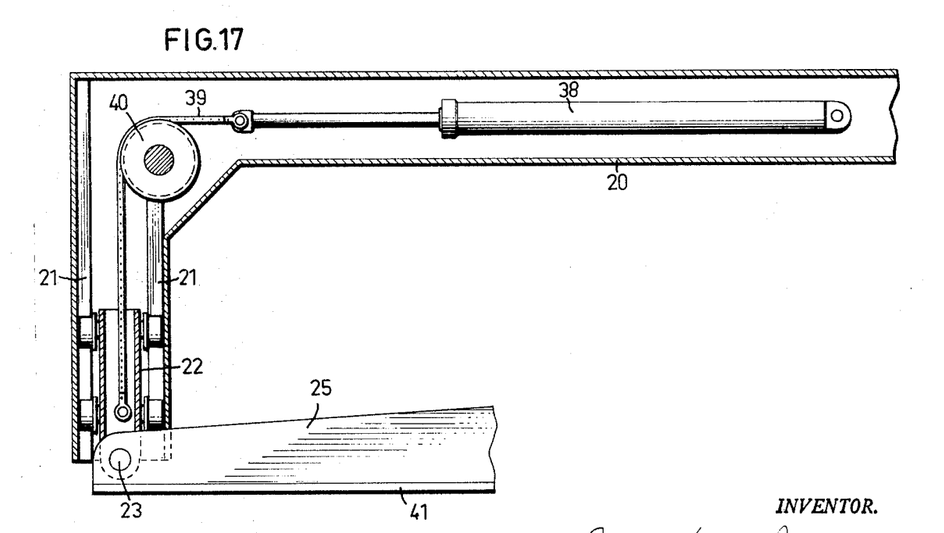
FIG. 17 shows an alternative arrangement of the hydraulic cylinder for lifting the carriage along the vertical guides.

An alternative and preferred embodiment is shown in FIG. 17 where a horizontal hydraulic cylinder 38 is secured with its forward end to the leg 20 and with its piston to a chain 39 running over a pulley 40 and secured to the carriage 22.

Each leg of the inner U-shaped frame in both embodiments shown has at its lower edge a horizontal load supporting flange 41.

Figures 19, 20:
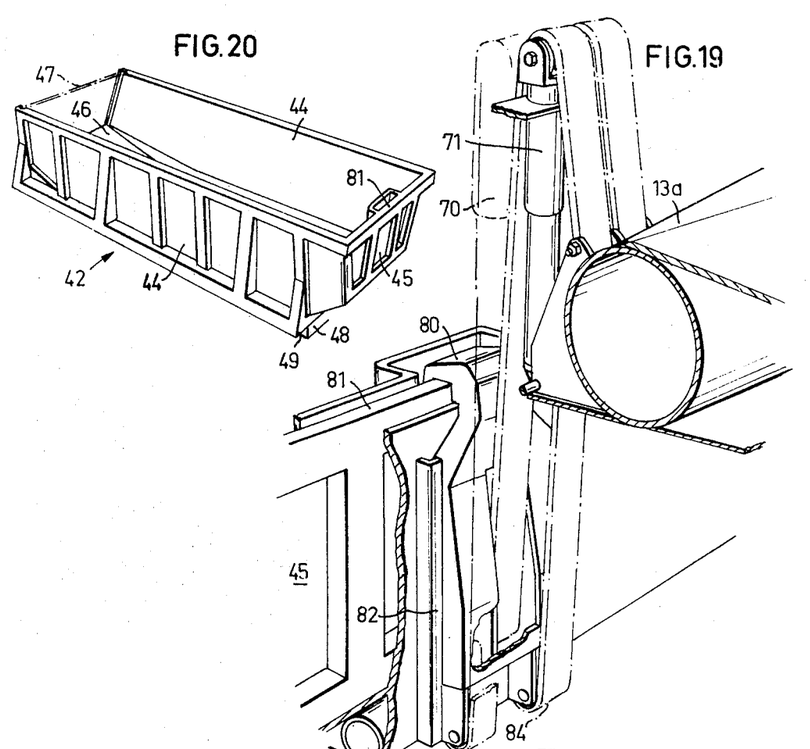
FIG. 19 is a detail view of the locking hook in FIG. 18 and the device for engaging or disengaging the hook.
FIG. 20 is a perspective view of a load carrying basket.

Referring now to FIGS. 1 to 11, the transport vehicle shown therein may alternatively be used for picking up a load carrying basket 42 as shown in FIG. 20, or a ladle 43 as shown in FIGS. 2 to 9.

The basket 42, FIG. 20, comprises side walls 44, a forward end wall 45 and a bottom 46. A rear end wall 47 indicated by dotted lines may be inserted. A base 48 is provided on the underside of the bottom 46 to raise the side edges of the side walls 44 above the ground. The base leaves free horizontal support surfaces 49 on either side of the base to be engaged by the flanges 41 of the legs of the inner U-shaped frame.

Figure 3:
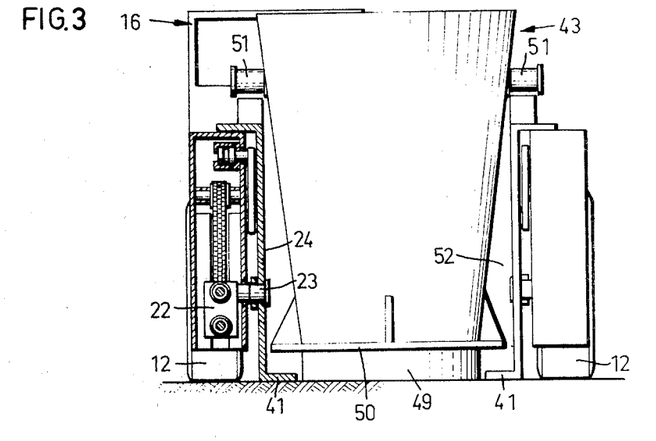
FIG. 3 is an end view, partially in cross section, taken at the vertical guides of one of the legs in FIG. 2.

The ladle 43 has similarly a base 49 and a flange 50 located at a free height above the ground and provided to be engaged by the flanges 41. The ladle 43 has also two supporting pins 51 on opposite sides of the ladle as shown in FIG. 3.

The inner U-shaped frame comprises two vertical side plates forming the legs 24 and interconnected by a forward end plate 52. At their upper edges the side plates have flanges 53 extending over the legs of the outer U-shaped frame.

Figure 4:
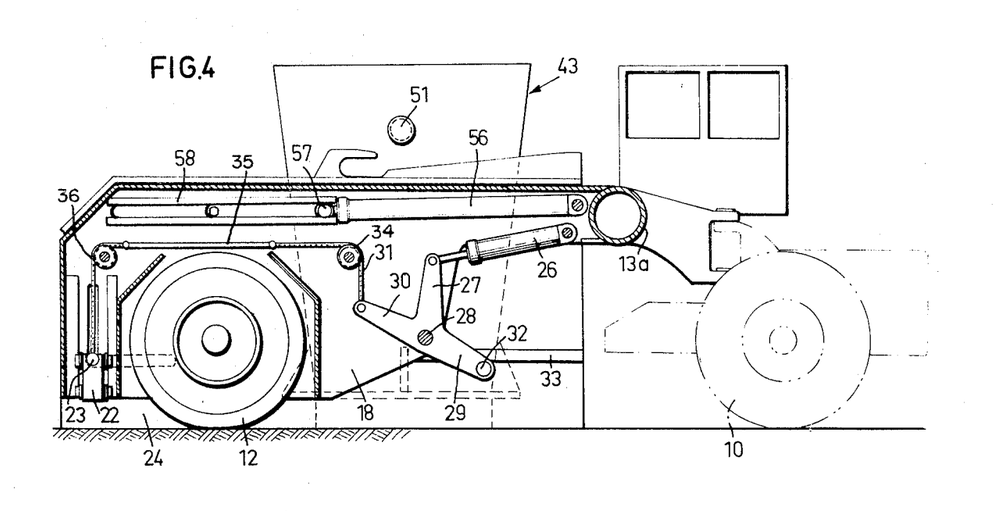
FIG. 4 is a diagrammatic longitudinal section through one of the legs with the inner U-shaped frame in the same position as in FIGS. 2 and 3.
Figure 5:
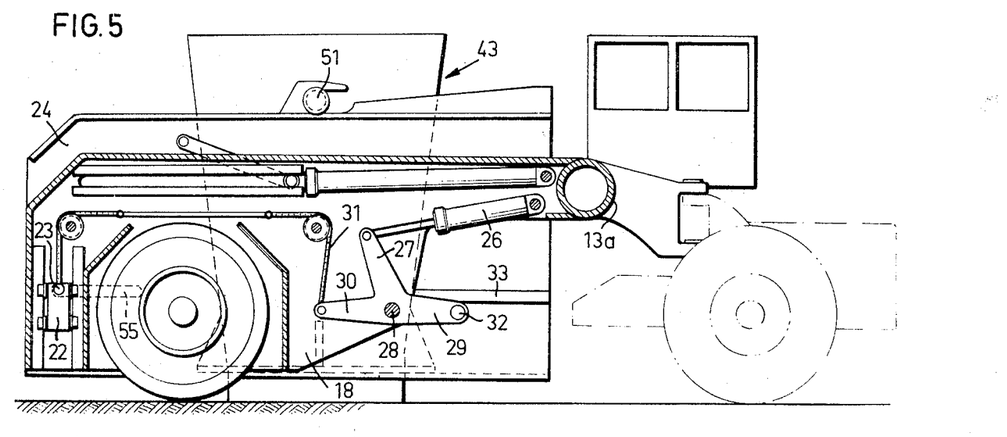
FIG. 5 illustrates how the inner U-shaped frame has been lifted to position a pair of hooks on its legs to engage a pair of supporting pins on the ladle.

On each flange 53 is provided a U-shaped hook 54, to engage the support pins 51, in the manner illustrated in FIGS. 4, 5 and 6. When the hooks 54 engage the pins 51 the flange 50 of the ladle 43 will simultaneously rest on the flanges 41. In this position the ladle is locked to the U-shaped inner frame.

Figure 10:
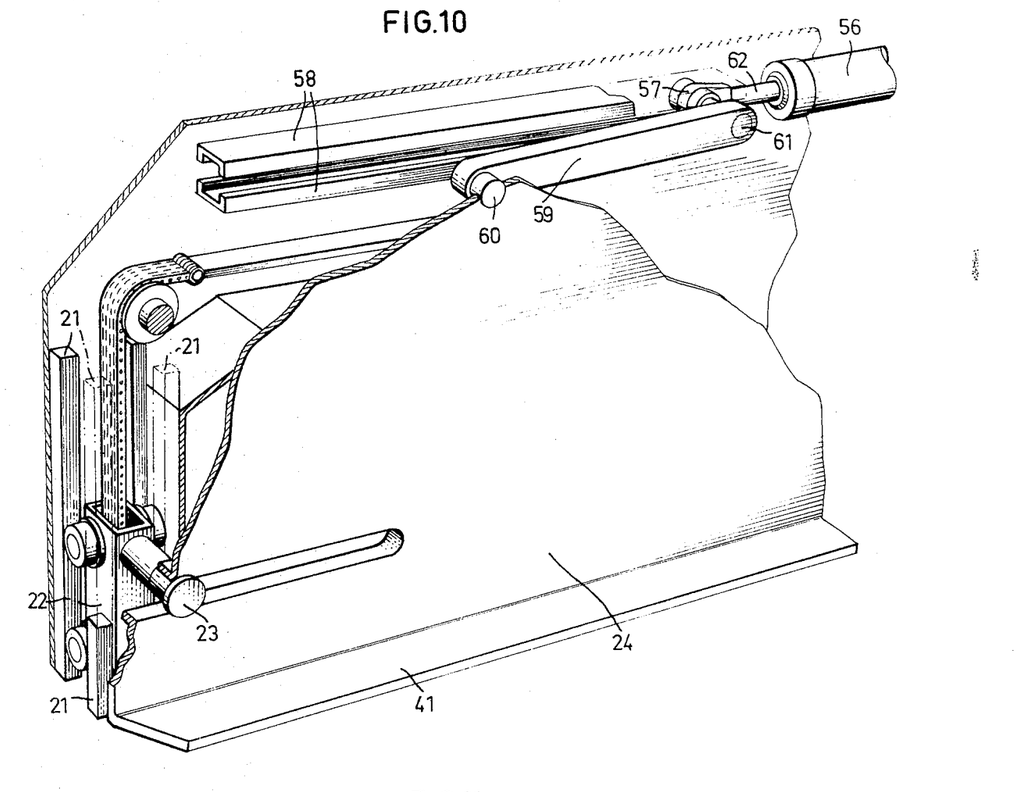
FIG. 10 is a diagrammatic broken perspective view of the vertical guides for a leg supporting carriage and of the hydraulic cylinder and piston for displacing and tilting the inner U-shaped frame.
Figure 11:
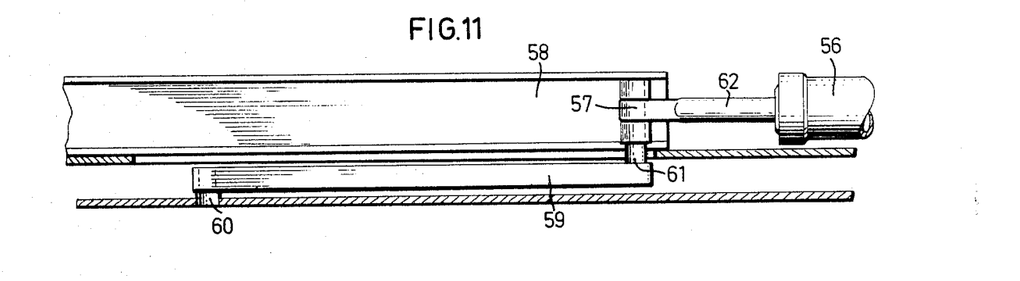
FIG. 11 is a detail view of the cylinder and piston arrangement in FIG. 10.

Upon transport the ladle 43 will be carried in a position located between the forward wheels 10 and the rearward wheels 12 as shown in FIG. 4 in order to distribute the load on the four wheels as even as possible. However, tilting of the ladle in this position would empty for instance the hot molten slag too near to the road wheels 12 having rubber tires which may be damaged by overheating. To avoid such damage the ladle should be moved to a position further back on the inner U-shaped frame. To this end the pivot pins 23 of the carriages 22 are journalled in longitudinal slots 55 in the side walls 24 to permit the inner U-shaped frame to be displaced from its forward end position shown in FIGS. 1 to 6, to its rearward end position as shown in FIG. 7. This displacement is effected by a double acting hydraulic jack 56 located in each of the legs of the outer U-shaped frame. The cylinder of the jack 56 has its forward end secured to the leg and the free end 57 of the piston rod is guided in horizontal guide rails 58 secured to the leg 17 and 18, respectively, as is best shown in FIGS. 10 and 11. A link 59 is at its rearward end pivotally connected with a pin 60 to the adjacent side plate 24 and with its forward end 61 to the end 57 of the piston rod 62.

When the jacks 56 have moved the inner U-shaped frame to its rearward end position in FIG. 7, further movement by means of the jacks 56 will tilt the inner frame with the ladle 43 (or basket) to the intermediate position shown in FIG. 8. Still further movement by means of the jacks 56 will tilt the inner frame and the ladle to the position shown in FIG. 9 to completely empty the ladle.

As understood from FIG. 9 the carriage 22 may be moved up and down so as to strike the corner 63 of the legs 24 against the ground so as to shake the ladle.

In the position shown in FIG. 8 the corner 64 of the inner frame has been lowered by the carriage 22 to rest against the floor. When driving the vehicle forward, the tilting of the inner frame will occur about the corner 64 as well as about the pivot pins 23 so that the tractor unit 11 will assist the jacks 56 for returning the inner frame and the ladle to its horizontal position. This may be of greatest advantage in case the molten slag has reached a lower temperature at which it will not leave the ladle in the position shown in FIG. 9. In this position, the inner frame can also be lowered to rest on the corners 63 of the legs 24.

Alternatively, there may be provided a further pair of hooks 54a located at a distance behind the hooks 54 corresponding to the length of the slots 55 in FIGS. 1 to 9, but in this case the slots 55 are omitted and replaced by a pivot bearing in the position of the pin 23 in FIG. 1. The ladle is then picked up by the forward pair of hooks 54 and transported in this position. Before tilting the ladle it is lowered to the ground and the vehicle is moved into position to engage the ladle with the rearward pair of hooks 54a. The ladle will then be tilted in about the same position as shown in FIGS. 8 and 9.

The vehicle shown in FIGS. 12 to 16 is somewhat simplified since it is merely intended for baskets. The two parallel legs 25 are interconnected by an end wall 65 having a supporting flange 66 in plane with the flanges 41.

A chain 67 is secured to the plate 65 and extends over a pulley 68 located at the upper end of a telescopic hydraulic jack 67 having its lower end secured to the transverse frame member 13a of the outer U-shaped frame. On the other side of the pulley 68 the chain has its end secured to the member 13a.

The hydraulic jacks 37 or 38, respectively, in both legs of the outer frame for lifting the carriages 22 are controlled to move in synchronism and have a separate control member for admitting pressure fluid to the jacks in a conventional manner. The pressure fluid to the jacks 69 is controlled by a second control member. This separated control of the lifting of the forward and rearward ends of the inner U-shaped member will enable to move lower or raise the rearward end of the inner U-shaped member relative to its forward end or vice versa which is of advantage when backing the vehicle into position for picking up a basket, when leaving a basket on the ground and when transporting the basket on the flanges 41. However, the forward and rearward ends of the inner frame are normally moved in synchronism between the upper and lower end position of the inner frame.

As shown in FIG. 16 the inner frame may also be tilted about the pivot pins 23 to an angle of about 45 degrees.

The basket 42 may be locked in its position on the flanges 41 by any conventional catch or locking means, provided on the vehicle in FIGS. 1 and 12. However, as to the vehicle in FIGS. 12 to 16, it is preferred to use the automatic locking device diagrammatically illustrated in FIGS. 18 and 19.

Figure 18:
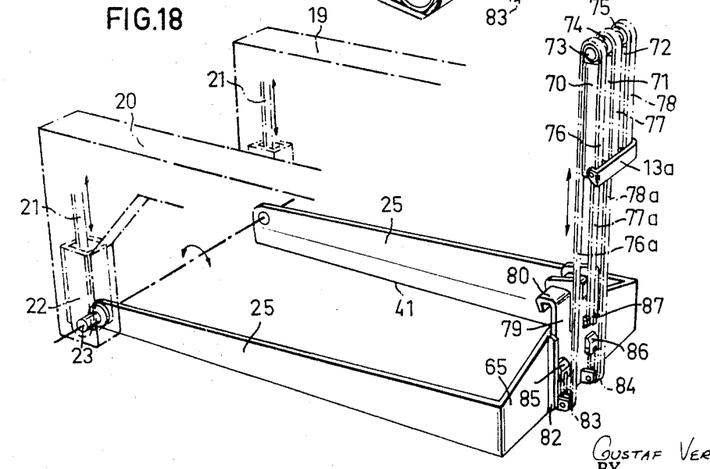
FIG. 18 is a diagrammatic perspective view to illustrate a preferred arrangement of hydraulic cylinders for lifting the forward end of the inner U-shaped frame and locking a basket to the frame.

In FIGS. 18 and 19 the jack 69 in FIGS. 12 to 16 has been replaced by three identical telescopic jacks 70, 71, 72, having each a pulley 73, 74 and 75, respectively, at their upper ends and having lower ends secured to the transverse frame member 13a of the outer U-shaped frame.

Three chains 76, 77 and 78, respectively, run over the pulleys. The forward ends of the chains are secured to the frame member 13 as shown in FIG. 19.

The rearward portions 76a, 77a, 78a of the chains extend downwardly. The intermediate chain 77a is secured to the base plate 79 of a locking hook 80 intended to engage the upper edge 81 of the basket 42 when positioned on the flanges. The base plate 79 is vertically movable along vertical guides 82 on the front side of the end plate 65 of the inner frame. At the lower edge of the end plate 65 are rotatably mounted two spaced pulleys 83 and 84. The outer chain portions 76a and 78a run around the pulleys 83 and 84, respectively, as illustrated and have their ends secured to mountings 85 and 86, respectively, located on the plate 65 at such height above the pulleys 83, 84 as to permit the hook 80 to move between its upper free end position (FIG. 18) and a lower basket engaging position (FIG. 19).

Starting in the position of the inner frame in FIG. 15, and having backed the vehicle so that a basket (not shown) is positioned between the legs 25, the locking hook 80 will be in its upper end position because the lengths of the chains 76, 77, 78 are dimensioned to obtain fully stretched chains when the jacks 70, 71, 72 are in their bottom positions and the forward end of the inner frame is supported by the pulleys 83, 84 resting on the lower bends of the two outer chains 76a, 78a. The mountings 85, 86 in turn are through the base plate 79 connected with the mounting 87 securing the end of the chain portion 77a to the base plate 79. When feeding pressure fluid simultaneously to all three jacks 70, 71, 72 they will be extended equally upwardly until the inner frame has been into contact with the edges of the basket. Due to the specific arrangement the two outer chain portions 76a, 78a will then urge the base plate 79 with the hook 80 downwardly relative to end plate 65 and this action is opposed by the chain portion 77a. However, the two jacks 70, 72 will overcome the action of the single jack 71 and thus, the hook 80 will be withdrawn downwardly to its lower end position in order to engage the edge of the basket as shown in FIG. 19.

What is claimed is:

1. A transport vehicle for heavy loads having an outer rigid frame with parallel legs supported by road wheels and interconnected at their forward ends by a transverse frame member to form a U-shaped frame connected to a tractor unit and supporting an inner rigid U-shaped frame with parallel legs provided with members for picking up and supporting a load carrying receptacle, characterized by vertical guides provided at each of the rear end portions of the legs of the outer U-shaped frame for guiding leg supporting members which pivotably support the legs of the inner U-shaped frame, and hydraulically operable power means for moving the forward and rearward ends of the inner U-shaped frame between a lower end position, and an upper end position and alternatively the forward end of the inner U-shaped frame further above the upper end position to tilt the inner U-shaped frame about the pivot axis of the leg supporting members.

2. A transport vehicle according to claim 1, wherein a carriage is provided to run along the vertical guides in each of the rear end portions of the legs of the outer U-shaped frame and is provided with a pivot pin supporting the adjacent end of the legs of the inner U-shaped frame.

3. A transport vehicle according to claim 2, wherein each carriage is vertically movable by means of a hydraulic cylinder and piston power device supported by the leg of the outer U-shaped frame.

4. A transport vehicle according to claim 3, wherein the hydraulic power device is disposed vertically above the carriage and is directly connected with the carriage.

5. A transport vehicle according to claim 3, wherein the hydraulic power device is disposed substantially horizontal in the respective leg of the outer U-shaped frame and is connected with the carriage by means of a chain running over a pulley disposed above the carriage and journalled on a pin secured to the leg of the outer U-shaped frame.

6. A transport vehicle according to claim 5, wherein the hydraulic power device is connected with the chain through a lever rotatably mounted in the leg of the outer U-shaped frame.

7. A transport vehicle according to claim 6, wherein the lever operated by the hydraulic power device has a rearwardly directed lever arm connected with said chain and a forwardly directed lever arm which is provided with a projection directed towards the adjacent leg of the inner U-shaped frame which is provided with a bracket member resting freely on the projection from the lever arm so as to enable tilting of the inner U-shaped frame about the pivot axis of the carriages, such tilting being effected by a second hydraulic power device located in each of the legs of the outer U-shaped frame.

8. A transport vehicle according to claim 7, wherein each leg of the outer U-shaped frame is in the form of a box-like structure enclosing the control members for the legs of the inner U-shaped frame, and each of the legs of the inner U-shaped frame comprises a vertical side plate disposed along the inside of the adjacent leg of the outer U-shaped frame and extending above its upper edge which supports at least one lying U-shaped hook, each pair of opposite hooks being adapted to engage corresponding pins extending from opposite sides of a load carrying ladle to be picked up and supported by the U-shaped inner frame which at its lower edges is provided with inwardly directed flanges to alternatively support a corresponding foot of the cradle or alternatively a load carrying backet.

9. A transport vehicle according to claim 8, wherein each of the legs of the inner U-shaped frame is provided with longitudinally extending guides engaged by the pivot pins of the vertically movable carriages so as to enable a displacement of the inner U-shaped frame from a forward end position to a rearward end position, the rearward end position being used when tilting the inner U-shaped frame for emptying a cradle supported by the flanges and the hooks.

10. A transport vehicle according to claim 9, wherein the inner U-shaped frame is tiltable more than 90 degrees from its horizontal transport position and the two hydraulic power devices controlling this tilting are of double acting type so as to enable retraction of the inner U-shaped frame from its rearward tilted end position.

11. A transport vehicle according to claim 1 wherein the inner U-shaped frame is at its forward end centrally supported by at least one hydraulic jack disposed between the forward end of the inner U-shaped frame and the outer U-shaped frame.

12. A transport vehicle according to claim 11, wherein the jack is pivotably mounted at one end of the outer U-shaped frame and is directed upwardly and is provided at its upper end with a pulley for a chain having one of its ends secured to the forward end of the outer U-shaped frame and extends over the pulley and has its other end secured to the forward end of the inner U-shaped frame.

13. A transport vehicle according to claim 12, wherein the hydraulic jack is of the telescopic type.

14. A transport vehicle according to claim 12, wherein there are three equal hydraulic jacks fed simultaneously with hydraulic pressure fluid for lifting the forward end of the inner U-shaped frame, all three jacks being pivotally secured at their lower ends to the outer U-shaped frame and having each at their upper ends a pulley for a chain, all three chains having one end secured to the outer U-shaped frame, whereas the other end of the intermediate chain is connected to a base of a hook having its base vertically movable along a vertical guide on the forward end of the inner U-shaped frame to move the hook between an upper and a lower end position, and the two outer chains run over two lower pulleys rotatably mounted on the base of the hook in a position beneath the attachment point of intermediate chain and having upwardly extending end portions of a length permitting the hook to move between said end positions, said end portions of the outer chains being secured at their ends to the base of the hook, whereby the inner U-shaped frame in its lower end position will be movable into engaging position for lifting a load carrying basket with the hook in its upper end position and the hook will automatically be moved into its lower basket engaging position when all three jacks are fed for lifting movement, the two outer jacks then overcoming the action of the intermediate jack on the hook so as to move the hook to its lower end position.

15. A transport vehicle according to claim 1, wherein the outer U-shaped frame is carried by a single pair of wheels, the tractor unit having a single pair of driving and steering wheels, and the U-shaped frame is at its central forward end connected with the tractor by means of a vertical pivot, a driver's cab being secured to the forward end of the outer U-shaped frame on one side only relative to the vertical pivot connection so that the driver's seat will be positioned in a vertical plane substantially coinciding with the inner side of one of the legs of the inner U-shaped frame in order to enable the driver to aim along the leg relative to a load carrying receptacle to be picked up by the inner U-shaped frame.

References Cited

UNITED STATES PATENTS

| | | | |
|---|---|---|---|
| 3,266,648 | 8/1966 | Hackett et al. | 214—300 |
| 3,335,885 | 8/1967 | Livingston | 214—314 |
| 3,378,155 | 4/1968 | Steiner | 214—390 |

HUGO O. SCHULZ, Primary Examiner

U.S. Cl. X.R.

214—390